United States Patent
Prasad

(10) Patent No.: US 10,913,434 B2
(45) Date of Patent: Feb. 9, 2021

(54) AUTOMATIC BRAKING SYSTEM FOR SLOW MOVING OBJECTS

(71) Applicant: APTIV TECHNOLOGIES LIMITED, St. Michael (BB)

(72) Inventor: Premchand Krishna Prasad, Carmel, IN (US)

(73) Assignee: Aptiv Technologies Limited, St. Michael (BB)

( * ) Notice: Subject to any disclaimer, the term of this patent is extended or adjusted under 35 U.S.C. 154(b) by 278 days.

(21) Appl. No.: 15/611,257

(22) Filed: Jun. 1, 2017

(65) Prior Publication Data
US 2018/0345922 A1    Dec. 6, 2018

(51) Int. Cl.
*B60T 7/22* (2006.01)
*B60T 8/171* (2006.01)
(Continued)

(52) U.S. Cl.
CPC .............. *B60T 7/22* (2013.01); *B60T 8/171* (2013.01); *B60T 8/172* (2013.01); *B60W 30/08* (2013.01);
(Continued)

(58) Field of Classification Search
None
See application file for complete search history.

(56) References Cited

U.S. PATENT DOCUMENTS

| 6,583,403 B1 | 6/2003 | Koike et al. |
| 6,842,684 B1 * | 1/2005 | Kade .................... B60W 10/18 701/70 |

(Continued)

FOREIGN PATENT DOCUMENTS

| CN | 1958348 | 5/2007 |
| DE | 102007046007 | 11/2008 |

(Continued)

OTHER PUBLICATIONS

U.S. Appl. No. 15/369,980, filed Dec. 6, 2016, entitled "Automatic Braking System".

(Continued)

*Primary Examiner* — Kelly D Williams
(74) *Attorney, Agent, or Firm* — Colby Nipper PLLC

(57) ABSTRACT

In accordance with one embodiment, a braking-system suitable for use on an automated vehicle is provided. The braking-system includes a ranging-sensor, a braking-actuator, and a controller in communication with the ranging-sensor and the braking-actuator. The ranging-sensor is used to detect a range-rate, a range, and a direction of an object proximate to a host-vehicle when the object resides in a field-of-view of the ranging-sensor. The field-of-view defines a conflict-zone and a conflict-buffer separate from the conflict-zone. The braking-actuator is used to control movement of the host-vehicle. The controller determines a trail of the object based on the range and the direction. The controller further classifies the object as slow-moving based on a rate-threshold. The controller further determines a tangent-vector based on the trail. The controller activates the braking-actuator when the object is slow-moving, the object is detected within the conflict-buffer, and the tangent-vector intersects the conflict-zone.

21 Claims, 7 Drawing Sheets

(51) Int. Cl.
*B60T 8/172* (2006.01)
*B60W 30/08* (2012.01)
*G01S 13/42* (2006.01)
*G01S 13/58* (2006.01)
*G01S 13/72* (2006.01)
*G01S 13/931* (2020.01)
*G01S 15/931* (2020.01)
*G01S 17/50* (2006.01)
*G01S 17/66* (2006.01)
*G01S 17/931* (2020.01)
*G01S 7/41* (2006.01)
*G01S 7/48* (2006.01)
*G01S 13/52* (2006.01)
*G01S 15/66* (2006.01)

(52) U.S. Cl.
CPC ............ *G01S 7/415* (2013.01); *G01S 7/4808* (2013.01); *G01S 13/52* (2013.01); *G01S 13/582* (2013.01); *G01S 13/584* (2013.01); *G01S 13/588* (2013.01); *G01S 13/723* (2013.01); *G01S 13/931* (2013.01); *G01S 17/50* (2013.01); *G01S 17/66* (2013.01); *G01S 17/931* (2020.01); *B60T 2210/32* (2013.01); *B60Y 2300/0954* (2013.01); *B60Y 2400/3017* (2013.01); *G01S 13/42* (2013.01); *G01S 15/66* (2013.01); *G01S 15/931* (2013.01)

(56) References Cited

U.S. PATENT DOCUMENTS

| | | | |
|---|---|---|---|
| 10,279,786 | B2 | 5/2019 | Prasad |
| 2004/0061598 | A1 | 4/2004 | King |
| 2007/0100527 | A1 | 5/2007 | Rao et al. |
| 2007/0228705 | A1 | 10/2007 | Rao et al. |
| 2009/0005959 | A1* | 1/2009 | Bargman ............... G08G 1/166 701/117 |
| 2010/0100268 | A1 | 4/2010 | Zhang et al. |
| 2010/0220189 | A1 | 9/2010 | Yanagi |
| 2012/0069182 | A1 | 3/2012 | Sumi et al. |
| 2012/0326917 | A1 | 12/2012 | Kiehne |
| 2013/0013184 | A1 | 1/2013 | Morotomi et al. |
| 2013/0028053 | A1 | 1/2013 | Tsuji et al. |
| 2013/0093583 | A1 | 4/2013 | Shapiro |
| 2013/0261916 | A1 | 10/2013 | Sekiguchi |
| 2014/0168415 | A1 | 6/2014 | Ihlenburg et al. |
| 2014/0278059 | A1* | 9/2014 | Gunther ............ G01C 21/3655 701/414 |
| 2015/0183431 | A1* | 7/2015 | Nanami ................ B60W 40/04 701/301 |
| 2015/0210280 | A1* | 7/2015 | Agnew ................ B60W 30/09 701/48 |
| 2015/0232073 | A1 | 8/2015 | Fujishiro |
| 2015/0234045 | A1 | 8/2015 | Rosenblum et al. |
| 2016/0055384 | A1* | 2/2016 | Yoo .................... G06K 9/00805 701/41 |
| 2016/0119587 | A1 | 4/2016 | Tan et al. |
| 2016/0272172 | A1 | 9/2016 | Lee |
| 2017/0162056 | A1 | 6/2017 | Feyerabend et al. |
| 2017/0197616 | A1 | 7/2017 | Ichikawa et al. |
| 2017/0356994 | A1 | 12/2017 | Wodrich et al. |
| 2018/0039283 | A1 | 2/2018 | Srivastava |
| 2018/0154871 | A1 | 6/2018 | Prasad |
| 2018/0297591 | A1* | 10/2018 | Minemura ............ B60W 30/09 |

FOREIGN PATENT DOCUMENTS

| | | | |
|---|---|---|---|
| DE | 102013102367 | 10/2013 | |
| DE | 112012006790 | 4/2015 | |
| DE | 112012006878 | 5/2015 | |
| DE | 102016003089 | 9/2016 | |
| EP | 2525336 | 11/2012 | |
| WO | WO-9820398 A1 * | 5/1998 | ........... G05D 1/0289 |
| WO | WO-2014146814 A1 * | 9/2014 | ........... G01S 13/931 |
| WO | 2016038773 | 7/2017 | |

OTHER PUBLICATIONS

"Advisory Action", U.S. Appl. No. 15/369,980, dated Nov. 26, 2018, 2 pages.
"Extended European Search Report", EP Application No. 17202677.5, dated May 16, 2018, 8 pages.
"Extended European Search Report", EP Application No. 18173643.0, dated Oct. 19, 2018, 6 pages.
"Final Office Action", U.S. Appl. No. 15/369,980, dated Sep. 4, 2018, 9 pages.
"Foreign Office Action", CN Application No. 201810550954.8, dated May 8, 2020, 21 pages.
"Foreign Office Action", CN Application No. 201711274581.8, dated Nov. 27, 2019, 11 pages.
"Non-Final Office Action", U.S. Appl. No. 15/369,980, dated Mar. 29, 2018, 8 pages.
"Notice of Allowance", U.S. Appl. No. 15/369,980, dated Jan. 7, 2019, 5 pages.

* cited by examiner

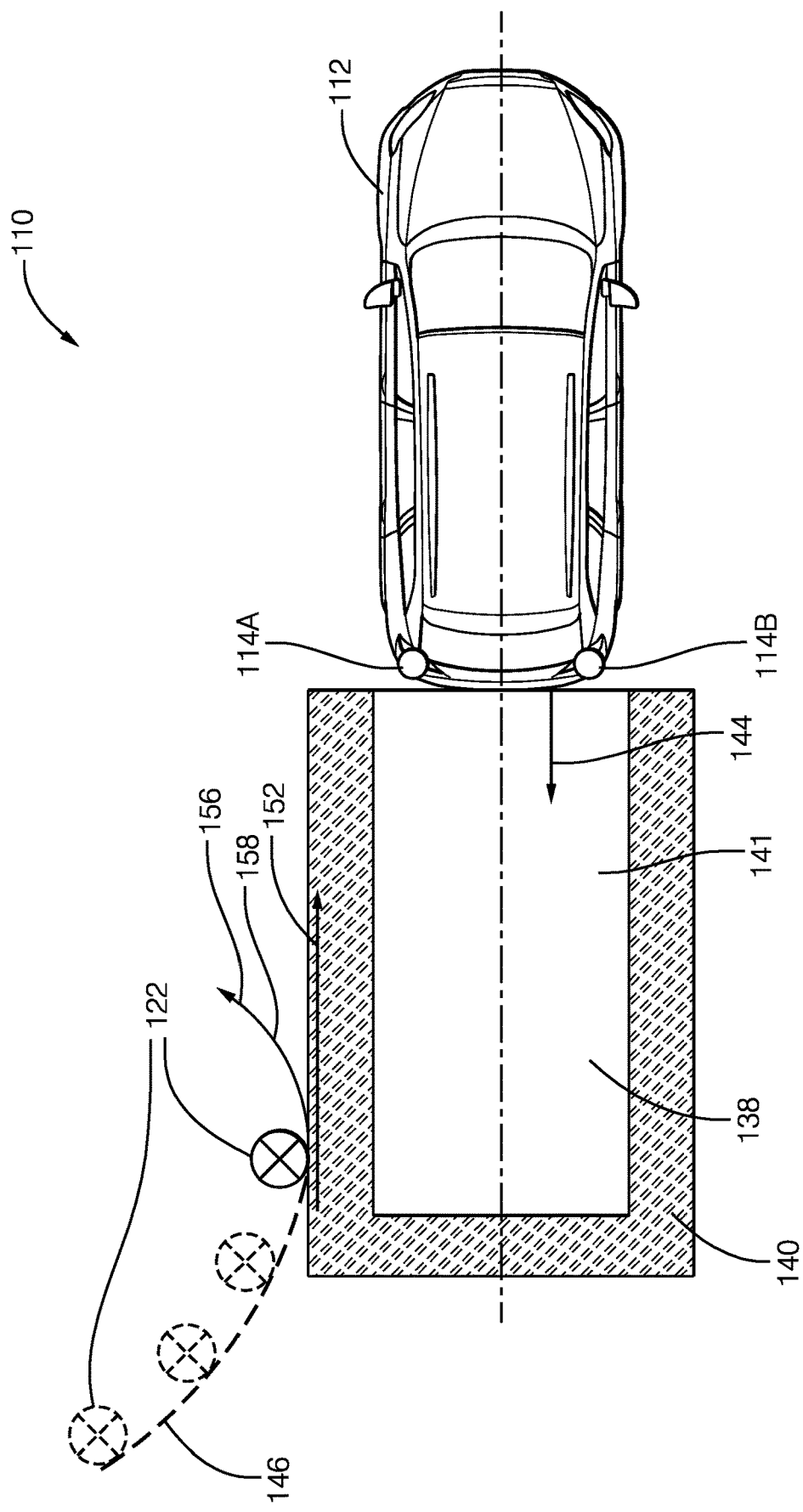

AUTOMATIC BRAKING SYSTEM FOR SLOW MOVING OBJECTS

TECHNICAL FIELD OF INVENTION

This disclosure generally relates to a braking-system suitable for use on an automated vehicle, and more particularly relates to a braking-system that recognizes a slow-moving object.

BACKGROUND OF INVENTION

It is known to automatically brake for moving-objects and stationary-objects detected proximate to a host-vehicle. Typical automatic braking systems have greater braking-distance thresholds for moving-objects compared to stationary-objects allowing greater time to stop the host-vehicle for the moving-object that may be approaching the host-vehicle. Stationary-objects typically require less time to stop the host-vehicle to prevent a collision because the host-vehicle controls the rate-of-closure to the stationary-object.

SUMMARY OF THE INVENTION

In accordance with one embodiment, a braking-system suitable for use on an automated vehicle is provided. The braking-system includes a ranging-sensor, a braking-actuator, and a controller in communication with the ranging-sensor and the braking-actuator. The ranging-sensor is used to detect a range-rate, a range, and a direction of an object proximate to a host-vehicle when the object resides in a field-of-view of the ranging-sensor. The field-of-view defines a conflict-zone and a conflict-buffer separate from the conflict-zone. The conflict-zone and the conflict-buffer correspond to a portion of the field-of-view, wherein the conflict-buffer defines a border of the conflict-zone. The braking-actuator is used to control movement of the host-vehicle. The controller determines a trail of the object based on the range and the direction. The controller further classifies the object as slow-moving when the range-rate is less than a rate-threshold and the trail is converging with the conflict-zone. The controller further determines a tangent-vector based on the trail. The controller activates the braking-actuator when the object is slow-moving, the object is detected within the conflict-buffer, and the tangent-vector intersects the conflict-zone.

In another embodiment, a method of operating a braking braking-system suitable for use on an automated vehicle is provided. The method includes the steps of detecting an object, controlling movement, determining a trail, classifying an object, determining a tangent-vector, and activating a braking-actuator. The step of detecting the object may include detecting, using a ranging-sensor, a range-rate, a range, and a direction of the object proximate to a host-vehicle when the object resides in a field-of-view of the ranging-sensor. The field-of-view defines a conflict-zone and a conflict-buffer separate from the conflict-zone. The conflict-zone and the conflict-buffer correspond to a portion of the field-of-view, wherein the conflict-buffer defines a border of the conflict-zone. The step of controlling movement may include controlling movement of the host-vehicle using a braking-actuator. The step of determining a trail may include determining, with a controller in communication with the ranging-sensor and the braking-actuator, a trail of the object based on the range and the direction. The step of classifying the object may include classifying, with the controller, the object as slow-moving when the range-rate is less than a rate-threshold and the trail is converging with the conflict-zone. The step of determining the tangent-vector may include determining, with the controller, a tangent-vector based on the trail. The step of activating the braking-actuator may include activating, with the controller, the braking-actuator when the object is slow-moving, the object is detected within the conflict-buffer, and the tangent-vector intersects the conflict-zone.

In yet another embodiment, an automated vehicular braking system is provided. The automated vehicular braking system includes a ranging-sensor, a braking-actuator, and a controller in communication with the ranging-sensor and the braking-actuator. The controller uses the ranging-sensor to detect an object proximate to a conflict-zone. The controller classifies the object as a slow-moving-object when a range-rate is less than a rate-threshold and the slow-moving-object is converging with the conflict-zone. The controller determines a vector of the slow-moving-object and activates the braking-actuator when the vector intersects the conflict-zone.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIG. 7 is an illustration of the host-vehicle of FIG. 6 equipped with the braking-system of FIG. 5 in accordance with yet another embodiment;

DETAILED DESCRIPTION

Figure 1:
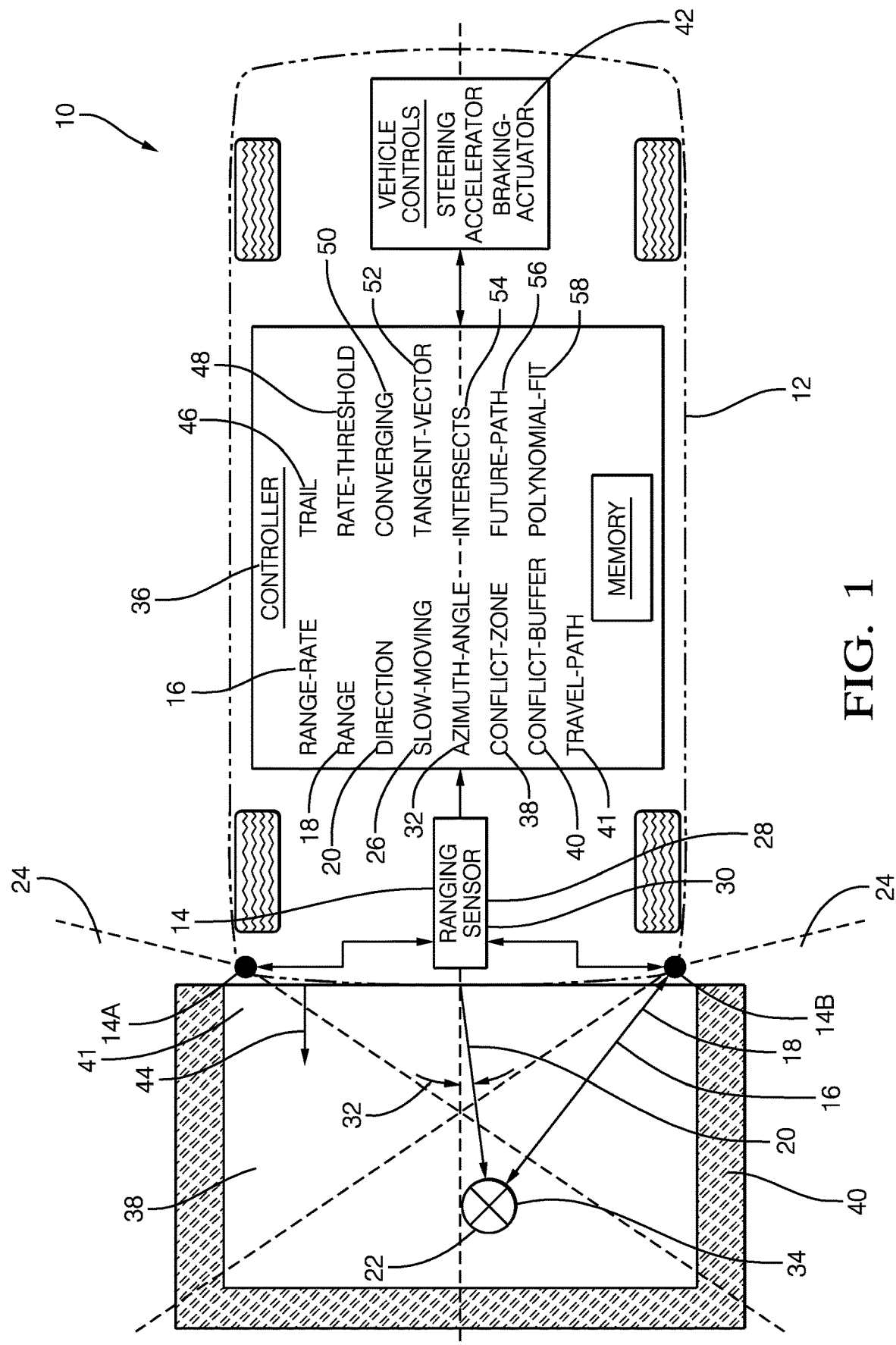
FIG. 1 is an illustration of a braking-system in accordance with one embodiment.

FIG. 1 illustrates a non-limiting example of a braking-system 10, hereafter referred to as the system 10, suitable for use on an automated vehicle 12, hereafter referred to as a host-vehicle 12. The system 10 includes a ranging-sensor 14 used to detect a range-rate 16, a range 18, and a direction 20 of an object 22 proximate to the host-vehicle 12 when the object 22 resides in a field-of-view 24 of the ranging-sensor 14. As will be described in more detail below, the system 10 is an improvement over prior braking systems because the system 10 is configured to classify the object 22 that is slow-moving 26 using the ranging-sensor 14. As used herein, the term 'automated vehicle' is not meant to suggest that fully automated or autonomous operation of the host-vehicle 12 is required. It is contemplated that the teachings presented herein are applicable to instances where the host-vehicle 12 is entirely manually operated by a human and the automation is merely providing emergency braking to the human.

The ranging-sensor 14 may be a radar-sensor 28, a lidar-sensor 30, an ultrasonic-sensor (not shown), or any combination thereof. Typically, radar-systems on vehicles are capable of only determining a range 18, a range-rate 16, and azimuth-angle 32 (e.g. left/right angle) to a target 34 so may be referred to as a two-dimensional (2D) radar-system. Other radar-systems are capable of determining an elevation-angle (not shown) to the target 34 so may be referred to as a three-dimensional (3D) radar-system. In the non-limiting example illustrated in FIG. 1, the ranging-sensor 14 is a 2D radar-sensor 28 and includes a left-sensor 14A and a right-sensor 14B. A radar-sensor-system with a similarly configured radar-sensor 28 is available from Delphi Inc. of Troy, Mich., USA and marketed as an Electronically Scanning Radar (ESR), Short Range Radar (SRR), or a Rear-Side-Detection-System (RSDS). It is contemplated that the teachings presented herein are applicable to both 2D radar-systems and 3-D radar-systems with one or more sensor devices, i.e. multiple instances of the radar-sensor 28. The radar-sensor 28 is generally configured to detect a reflection of a radar-signal (not shown) that may include data indicative of the detected target 34 proximate to the host-vehicle 12. As used herein, the detected target 34 may be the object 22 that is detected by the radar-sensor 28 and tracked by a controller 36, as will be described below.

By way of example and not limitation, the radar-sensor 28 may be configured to output a continuous or periodic data stream that includes a variety of signal characteristics associated with each target 34 detected. The signal characteristics may include or be indicative of, but are not limited to, the range 18 to the target 34 from the host-vehicle 12, the azimuth-angle 32 to the target 34 relative to a host-vehicle-longitudinal-axis (not specifically shown), an amplitude (not shown) of the radar-signal detected by the radar-sensor 28, and a relative-velocity of closure (i.e. the range-rate 16) relative to the target 34.

Figure 2:
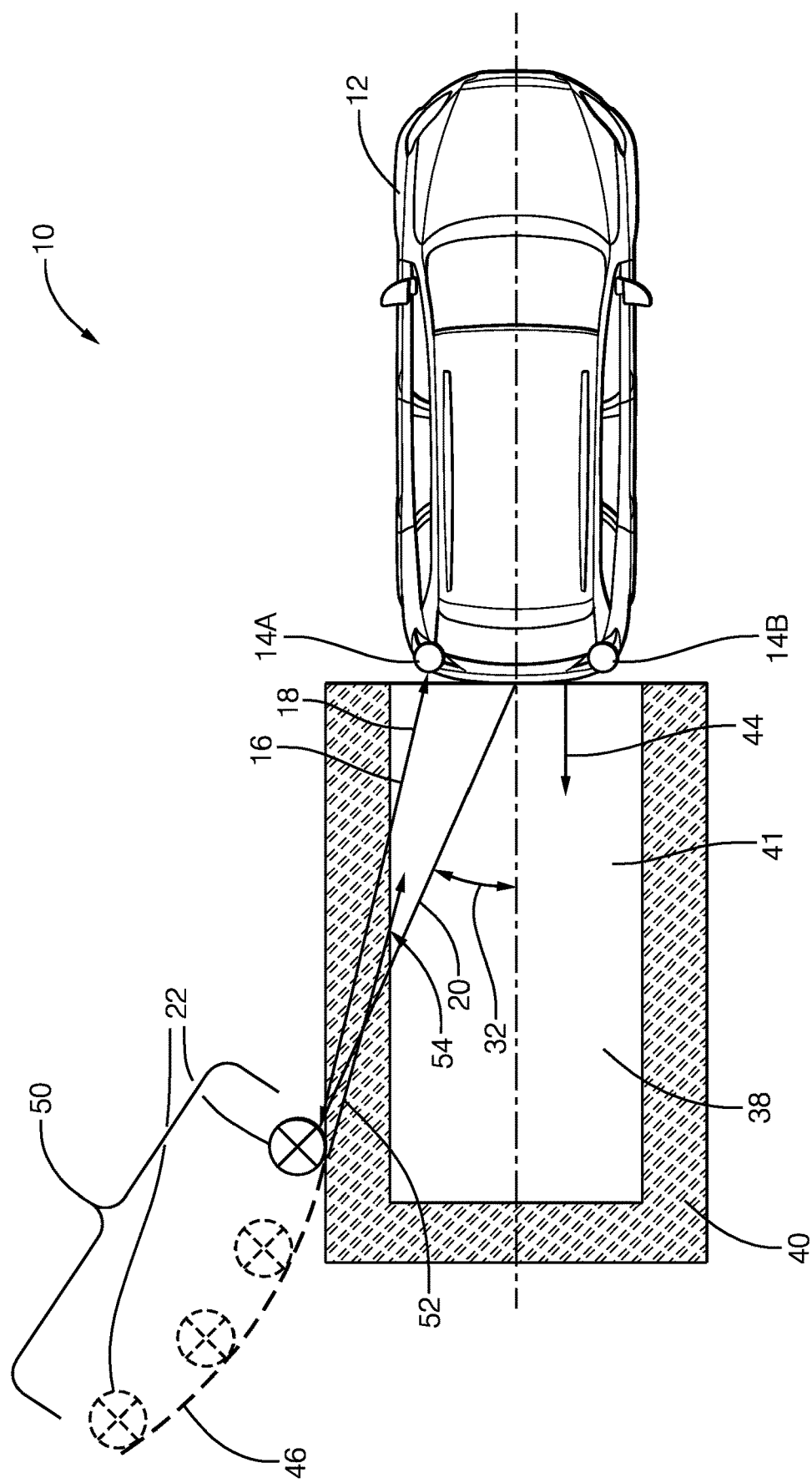
FIG. 2 is an illustration of a host-vehicle equipped with the braking-system of FIG. 1 in accordance with one embodiment.
Figure 3:
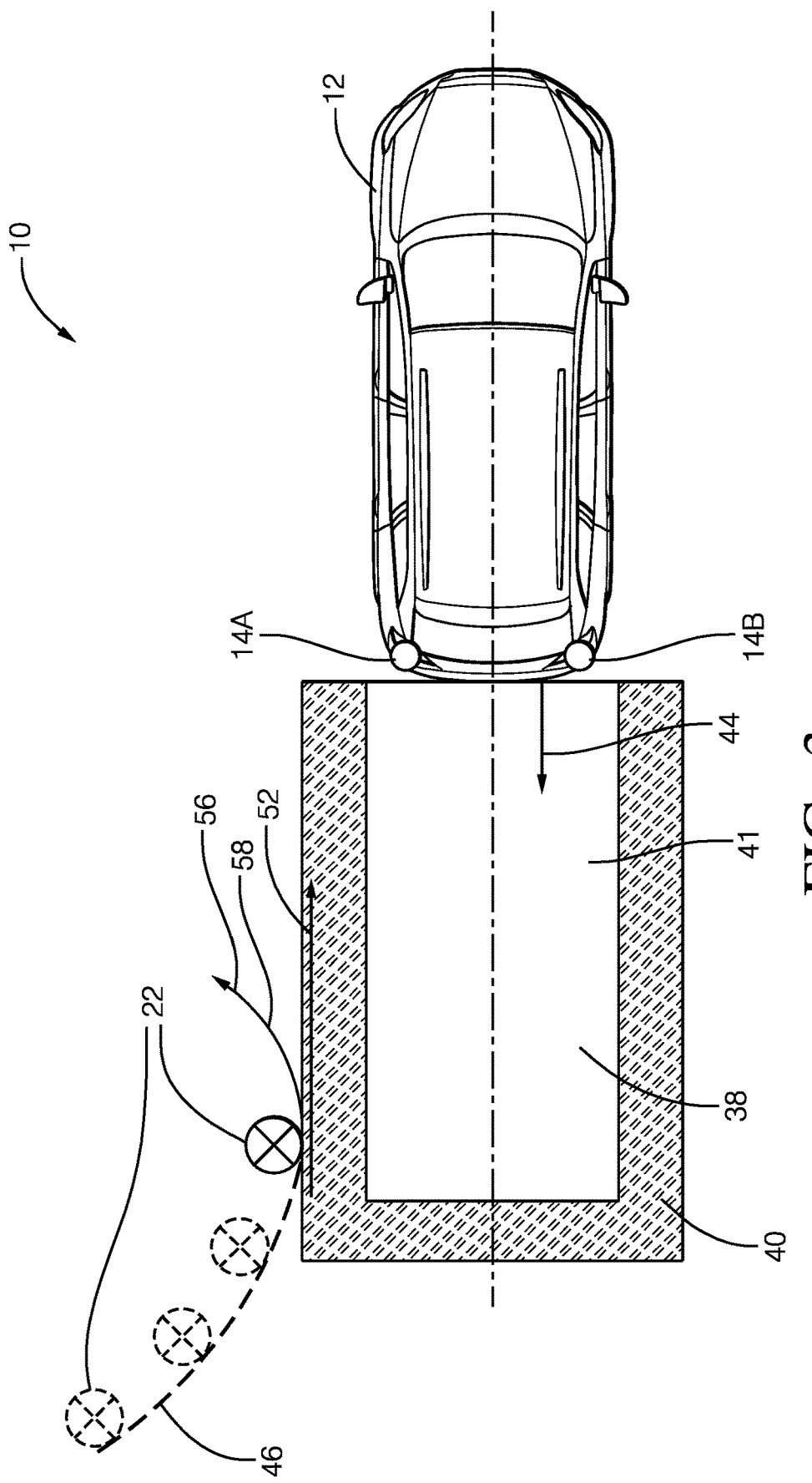
FIG. 3 is an illustration of the host-vehicle of FIG. 2 equipped with the braking-system of FIG. 1 in accordance with one embodiment.

The field-of-view 24 defines a conflict-zone 38 and a conflict-buffer 40 separate from the conflict-zone 38. The conflict-zone 38 and the conflict-buffer 40 correspond to a portion of the field-of-view 24, wherein the conflict-buffer 40 defines a border of the conflict-zone 38, as illustrated in FIGS. 1-3. The conflict-zone 38 may be a projection of a travel-path 41 of the host-vehicle 12, and may extend from both a left-corner and a right-corner of the host-vehicle 12 for any distance required to meet the application requirements. The length of the conflict-zone 38 may be varied based on a speed (not shown) of the host-vehicle 12. The conflict-buffer 40 may be any size required and may also be varied based on the speed of the host-vehicle 12. The object 22 in the conflict-zone 38 and the host-vehicle 12 will collide if the host-vehicle 12 continues to move toward the object 22. The field-of-view 24 also has a known vertical-angle (not shown) and a known horizontal-angle (not shown) that are design features of the ranging-sensor 14 and determine how close to the host-vehicle 12 the object 22 may be detected.

The system 10 also includes a braking-actuator 42 that controls movement 44 of the host-vehicle 12. Movement 44 may be defined as forward-movement and/or rearward-movement of the host-vehicle 12. In the non-limiting examples illustrated in FIGS. 1-3 the movement 44 is rearward-movement, that is, the host-vehicle 12 is performing a backing-maneuver. The braking-actuator 42 may be installed on each wheel of the host-vehicle 12 and may be a friction-device. The braking-actuator 42 may also be an electric-motor that may utilize regenerative-braking that may exist on hybrid-electric-vehicles or electric-vehicles, as will be understood by one skilled in the art.

The system 10 also includes the controller 36 in communication with the ranging-sensor 14 and the braking-actuator 42. The controller 36 may include a processor (not shown) such as a microprocessor or other control circuitry such as analog and/or digital control circuitry including an application specific integrated circuit (ASIC) for processing data as should be evident to those in the art. The controller 36 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the object 22 is going to be in the intended path of the host-vehicle 12 based on signals received by the controller 36 from the ranging-sensor 14 as described herein.

The controller 36 may analyze the radar-signal to categorize the data from each detected target 34 with respect to a list of previously detected targets 34 having established tracks. As used herein, a track refers to one or more data sets that have been associated with a particular one of the detected targets 34. By way of example and not limitation, if the amplitude of the radar-signal is above a predetermined amplitude threshold, then the controller 36 determines if the data corresponds to a previously detected target 34 or if a new-target has been detected. If the data corresponds to a previously detected target 34, the data is added to or combined with prior data to update the track of the previously detected target 34. If the data does not correspond to any previously detected target 34 because, for example, it is located too far away from any previously detected target 34, then it may be characterized as a new-target and assigned a unique track identification number. The identification number may be assigned according to the order that data for a new detected target 34 is received, or may be assigned an identification number according to a grid-location (not shown) in the field-of-view 24.

As illustrated in FIG. 2, the controller 36 may determine a trail 46 of the object 22 based on the range 18 and the direction 20. The trail 46 may be determined by any of the known curve fitting techniques including, but not limited to a least-squares fit method. The controller 36 may classify the object 22 as slow-moving 26 when the range-rate 16 is less than a rate-threshold 48 and the trail 46 is converging 50 with the conflict-zone 38. The object 22 that is slow-moving 26 may appear to the typical radar-system as a stationary-object (not shown) when the speed is less than the rate-threshold 48. The rate-threshold 48 may be user defined and experimentation by the Inventor has discovered that the speed of the object 22 of less than 4.8 kilometer per hour (4.8 kph) is indicative of the object 22 that is slow-moving 26. The controller 36 may determine that the object 22 is converging 50 with the conflict-zone 38 based on a history of the tracks stored in the memory, where a reduction in the range 18 of the object 22 may be evident. In contrast to the slow-moving 26 object 22, the stationary-object may appear that it is moving in a line parallel to the host-vehicle 12 as the host-vehicle 12 performs the backing-maneuver, as will be understood by one skilled in the art.

The controller 36 may then determine a tangent-vector 52 based on the trail 46, and may activate the braking-actuator 42 when the object 22 is slow-moving 26, the object 22 is detected within the conflict-buffer 40, and the tangent-vector 52 intersects 54 the conflict-zone 38, as illustrated in FIG. 2. The controller 36 may further determine the tangent-vector 52 at a point where the object 22 enters the conflict-buffer 40. As used herein, the tangent-vector 52 is tangent to the curve created by the trail 46.

As illustrated in FIG. 3, the controller 36 may further predict a future-path 56 of the object 22 based on the trail 46. The future-path 56 may be a polynomial-fit 58 of the trail 46 using any of the known methods of curve fitting. The controller 36 may not activate the braking-actuator 42 when the object 22 is detected within the conflict-buffer 40 and the tangent-vector 52 does not intersect 54 the conflict-zone 38.

Figure 4:
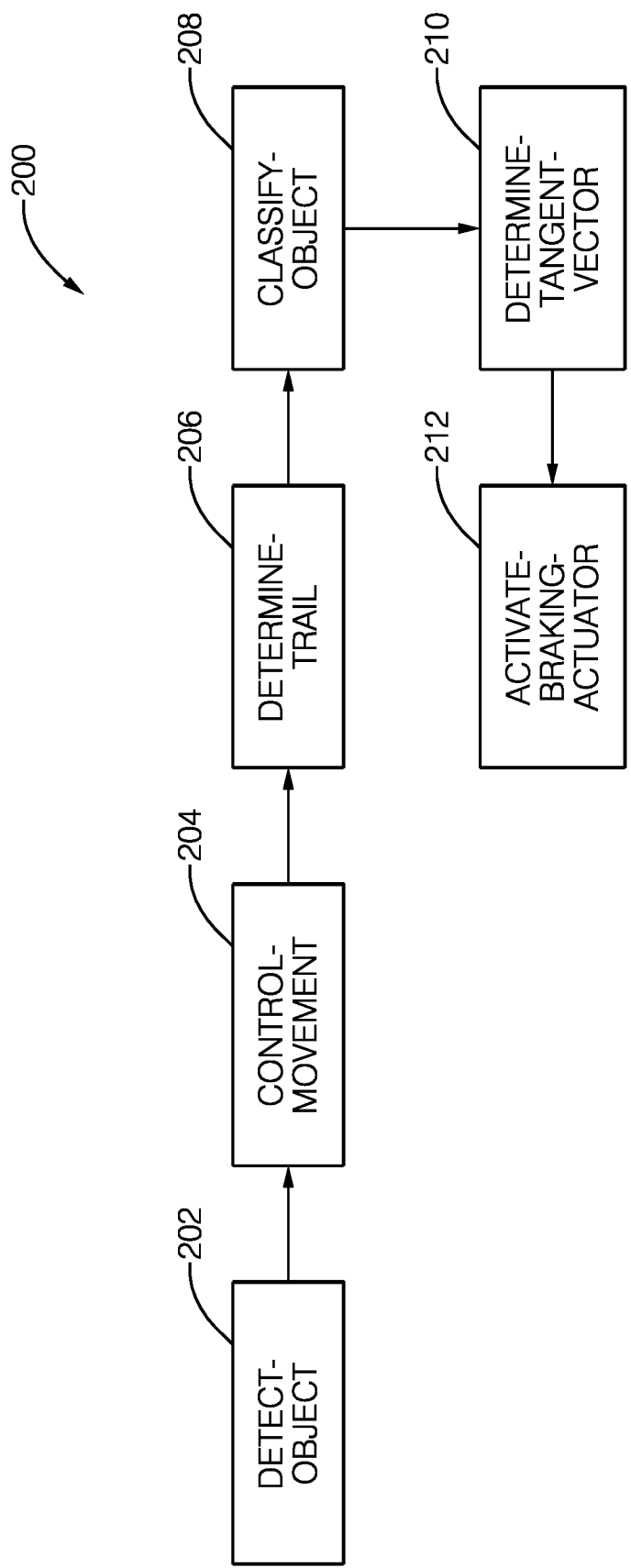
FIG. 4 is a flow chart of an illustration of a method of operating a braking-system in accordance with another embodiment.

FIG. 4 illustrates a non-limiting example of another embodiment of a method 200 of operating a braking-system 10, hereafter referred to as the system 10, suitable for use on an automated vehicle, hereafter referred to as a host-vehicle 12. The method 200 includes the steps of detecting an object 22, controlling movement 44, determining a trail 46, classifying an object 22, determining a tangent-vector 52, and activating a braking-actuator 42.

Step 202, DETECT-OBJECT, may include detecting, using a ranging-sensor 14, a range-rate 16, a range 18, and a direction 20 of an object 22 proximate to the host-vehicle 12 when the object 22 resides in a field-of-view 24 of the ranging-sensor 14. As will be described in more detail below, the system 10 is an improvement over prior braking systems because the system 10 is configured to classify the object 22 that is slow-moving 26 using the ranging-sensor 14. As used herein, the term 'automated vehicle' is not meant to suggest that fully automated or autonomous operation of the host-vehicle 12 is required. It is contemplated that the teachings presented herein are applicable to instances where the host-vehicle 12 is entirely manually operated by a human and the automation is merely providing emergency braking to the human.

The ranging-sensor 14 may be a radar-sensor 28, a lidar-sensor 30, an ultrasonic-sensor (not shown), or any combination thereof. Typically, radar-systems on vehicles are capable of only determining a range 18, a range-rate 16, and azimuth-angle 32 (e.g. left/right angle) to a target 34 so may be referred to as a two-dimensional (2D) radar-system. Other radar-systems are capable of determining an elevation-angle (not shown) to the target 34 so may be referred to as a three-dimensional (3D) radar-system. In the non-limiting example illustrated in FIG. 1, the ranging-sensor 14 is a 2D radar-sensor 28 and includes a left-sensor 14A and a right-sensor 14B. A radar-sensor-system with a similarly configured radar-sensor 28 is available from Delphi Inc. of Troy, Mich., USA and marketed as an Electronically Scanning Radar (ESR), Short Range Radar (SRR), or a Rear-Side-Detection-System (RSDS). It is contemplated that the teachings presented herein are applicable to both 2D radar-systems and 3-D radar-systems with one or more sensor devices, i.e. multiple instances of the radar-sensor 28. The radar-sensor 28 is generally configured to detect a reflection of a radar-signal (not shown) that may include data indicative of the detected target 34 proximate to the host-vehicle 12. As used herein, the detected target 34 may be the object 22 that is detected by the radar-sensor 28 and tracked by a controller 36, as will be described below.

By way of example and not limitation, the radar-sensor 28 may be configured to output a continuous or periodic data stream that includes a variety of signal characteristics associated with each target 34 detected. The signal characteristics may include or be indicative of, but not limited to, the range 18 to the target 34 from the host-vehicle 12, the azimuth-angle 32 to the target 34 relative to a host-vehicle-longitudinal-axis (not specifically shown), an amplitude (not shown) of the radar-signal detected by the radar-sensor 28, and a relative-velocity of closure (i.e. the range-rate 16) relative to the target 34.

The field-of-view 24 defines a conflict-zone 38 and a conflict-buffer 40 separate from the conflict-zone 38. The conflict-zone 38 and the conflict-buffer 40 correspond to a portion of the field-of-view 24, wherein the conflict-buffer 40 defines a border of the conflict-zone 38, as illustrated in FIGS. 1-3. The conflict-zone 38 may be a projection of a travel-path 41 of the host-vehicle 12, and may extend from both a left-corner and a right-corner of the host-vehicle 12 for any distance required to meet the application requirements. The length of the conflict-zone 38 may be varied based on a speed (not shown) of the host-vehicle 12. The conflict-buffer 40 may be any size required and may also be varied based on the speed of the host-vehicle 12. The object 22 in the conflict-zone 38 and the host-vehicle 12 will collide if the host-vehicle 12 continues to move toward the object 22. The field-of-view 24 also has a known vertical-angle (not shown) and a known horizontal-angle (not shown) that are design features of the ranging-sensor 14 and determine how close to the host-vehicle 12 the object 22 may be detected.

Step 204, CONTROL-MOVEMENT, may include controlling movement 44 of the host-vehicle 12 using a braking-actuator 42. Movement 44 may be defined as forward-movement and/or rearward-movement of the host-vehicle 12. In the non-limiting examples illustrated in FIGS. 1-3 the movement 44 is rearward-movement, that is, the host-vehicle 12 is performing a backing-maneuver. The braking-actuator 42 may be installed on each wheel of the host-vehicle 12 and may be a friction-device. The braking-actuator 42 may also be an electric-motor that may utilize regenerative-braking that may exist on hybrid-electric-vehicles or electric-vehicles, as will be understood by one skilled in the art.

Step 206, DETERMINE-TRAIL, may include determining, with the controller 36 in communication with the ranging-sensor 14 and the braking-actuator 42, a trail 46 of the object 22 based on the range 18 and the direction 20. The controller 36 may include a processor (not shown) such as a microprocessor or other control circuitry such as analog and/or digital control circuitry including an application specific integrated circuit (ASIC) for processing data as should be evident to those in the art. The controller 36 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the object 22 is going to be in the intended path of the host-vehicle 12 based on signals received by the controller 36 from the ranging-sensor 14 as described herein.

The controller 36 may analyze the radar-signal to categorize the data from each detected target 34 with respect to a list of previously detected targets 34 having established tracks. As used herein, a track refers to one or more data sets that have been associated with a particular one of the detected targets 34. By way of example and not limitation, if the amplitude of the radar-signal is above a predetermined amplitude threshold, then the controller 36 determines if the data corresponds to a previously detected target 34 or if a new-target has been detected. If the data corresponds to a previously detected target 34, the data is added to or combined with prior data to update the track of the previously detected target 34. If the data does not correspond to any previously detected target 34 because, for example, it is located too far away from any previously detected target 34, then it may be characterized as a new-target and assigned a unique track identification number. The identification number may be assigned according to the order that data for a new detected target 34 is received, or may be assigned an identification number according to a grid-location (not shown) in the field-of-view 24. As illustrated in FIG. 2, the controller 36 may determine a trail 46 of the object 22 based on the range 18 and the direction 20. The trail 46 may be determined by any of the known curve fitting techniques including, but not limited to a least-squares fit method.

Step 208, CLASSIFY-OBJECT, may include classifying the object 22 as slow-moving 26 when the range-rate 16 is less than a rate-threshold 48 and the trail 46 is converging 50 with the conflict-zone 38. The object 22 that is slow-moving 26 may appear to the typical radar-system as a stationary-object (not shown) when the speed is less than the rate-threshold 48. The rate-threshold 48 may be user defined and experimentation by the Inventor has discovered that the speed of the object 22 of less than 4.8 kilometer per hour (4.8 kph) is indicative of the object 22 that is slow-moving 26. The controller 36 may determine that the object 22 is converging 50 with the conflict-zone 38 based on a history of the tracks stored in the memory, where a reduction in the range 18 of the object 22 may be evident. In contrast to the slow-moving 26 object 22, the stationary-object may appear that it is moving in a line parallel to the host-vehicle 12 as the host-vehicle 12 performs the backing-maneuver, as will be understood by one skilled in the art.

Step 210, DETERMINE-TANGENT-VECTOR, may include determining a tangent-vector 52 based on the trail 46. The controller 36 may further determine the tangent-vector 52 at a point where the object 22 enters the conflict-buffer 40. As used herein, the tangent-vector 52 is tangent to the curve created by the trail 46.

Step 212, ACTIVATE-BRAKING-ACTUATOR, may include activating the braking-actuator 42 when the object 22 is slow-moving 26, the object 22 is detected within the conflict-buffer 40, and the tangent-vector 52 intersects 54 the conflict-zone 38, as illustrated in FIG. 2. As illustrated in FIG. 3, the controller 36 may further predict a future-path 56 of the object 22 based on the trail 46. The future-path 56 may be a polynomial-fit 58 of the trail 46 using any of the known methods of curve fitting. The controller 36 may prevent activation of the braking-actuator 42 when the object 22 is detected within the conflict-buffer 40 and the tangent-vector 52 does not intersect 54 the conflict-zone 38.

Figure 5:
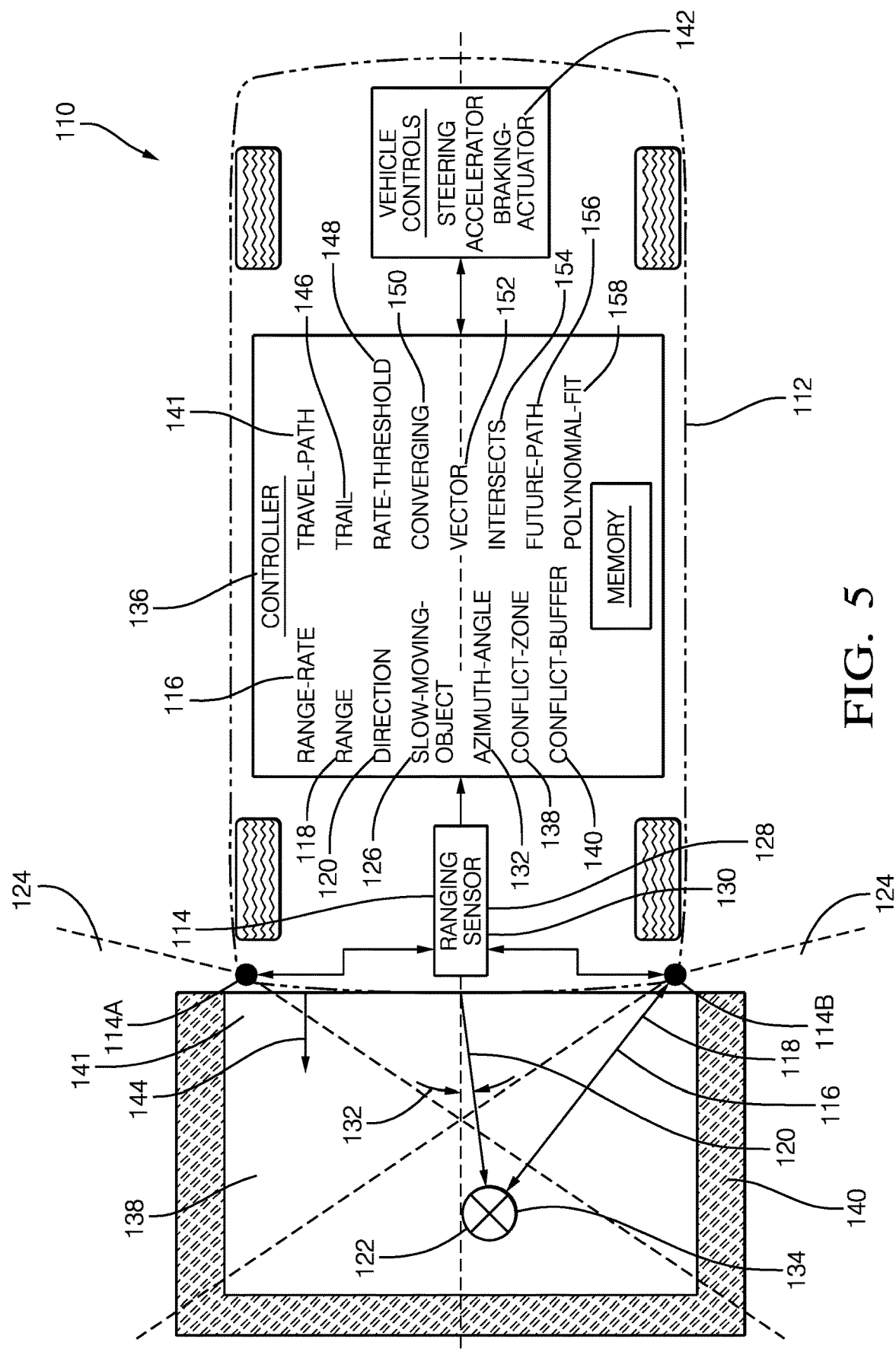
FIG. 5 is an illustration of a braking-system in accordance with yet another embodiment.

FIG. 5 illustrates a non-limiting example of yet another embodiment of an automated vehicular braking system 110, hereafter referred to as the system 110, suitable for use on an automated vehicle, hereafter referred to as the host-vehicle 112. The system 110 includes a ranging-sensor 114 used to detect a range-rate 116, a range 118, and a direction 120 of an object 122 proximate to the host-vehicle 112 when the object 122 resides in a field-of-view 124 of the ranging-sensor 114. As will be described in more detail below, the system 110 is an improvement over prior braking systems because the system 110 is configured to classify the object 122 that is a slow-moving-object 126 using the ranging-sensor 114. As used herein, the term 'automated vehicle' is not meant to suggest that fully automated or autonomous operation of the host-vehicle 112 is required. It is contemplated that the teachings presented herein are applicable to instances where the host-vehicle 112 is entirely manually operated by a human and the automation is merely providing emergency braking to the human.

The ranging-sensor 114 may be a radar-sensor 128, a lidar-sensor 130, an ultrasonic-sensor (not shown), or any combination thereof. Typically, radar-systems on vehicles are capable of only determining a range 118, a range-rate 116, and azimuth-angle 132 (e.g. left/right angle) to a target 134 so may be referred to as a two-dimensional (2D) radar-system. Other radar-systems are capable of determining an elevation-angle (not shown) to the target 134 so may be referred to as a three-dimensional (3D) radar-system. In the non-limiting example illustrated in FIG. 5, the ranging-sensor 114 is a 2D radar-sensor 128 and includes a left-sensor 114A and a right-sensor 114B. A radar-sensor-system with a similarly configured radar-sensor 128 is available from Delphi Inc. of Troy, Mich., USA and marketed as an Electronically Scanning Radar (ESR), Short Range Radar (SRR), or a Rear-Side-Detection-System (RSDS). It is contemplated that the teachings presented herein are applicable to both 2D radar-systems and 3-D radar-systems with one or more sensor devices, i.e. multiple instances of the radar-sensor 128. The radar-sensor 128 is generally configured to detect a reflection of a radar-signal (not shown) that may include data indicative of the detected target 134 proximate to the host-vehicle 112. As used herein, the detected target 134 may be the object 122 that is detected by the radar-sensor 128 and tracked by a controller 136, as will be described below.

By way of example and not limitation, the radar-sensor 128 may be configured to output a continuous or periodic data stream that includes a variety of signal characteristics associated with each target 134 detected. The signal characteristics may include or be indicative of, but are not limited to, the range 118 to the target 134 from the host-vehicle 112, the azimuth-angle 132 to the target 134 relative to a host-vehicle-longitudinal-axis (not specifically shown), an amplitude (not shown) of the radar-signal detected by the radar-sensor 128, and a relative-velocity of closure (i.e. the range-rate 116) relative to the target 134.

Figure 6:
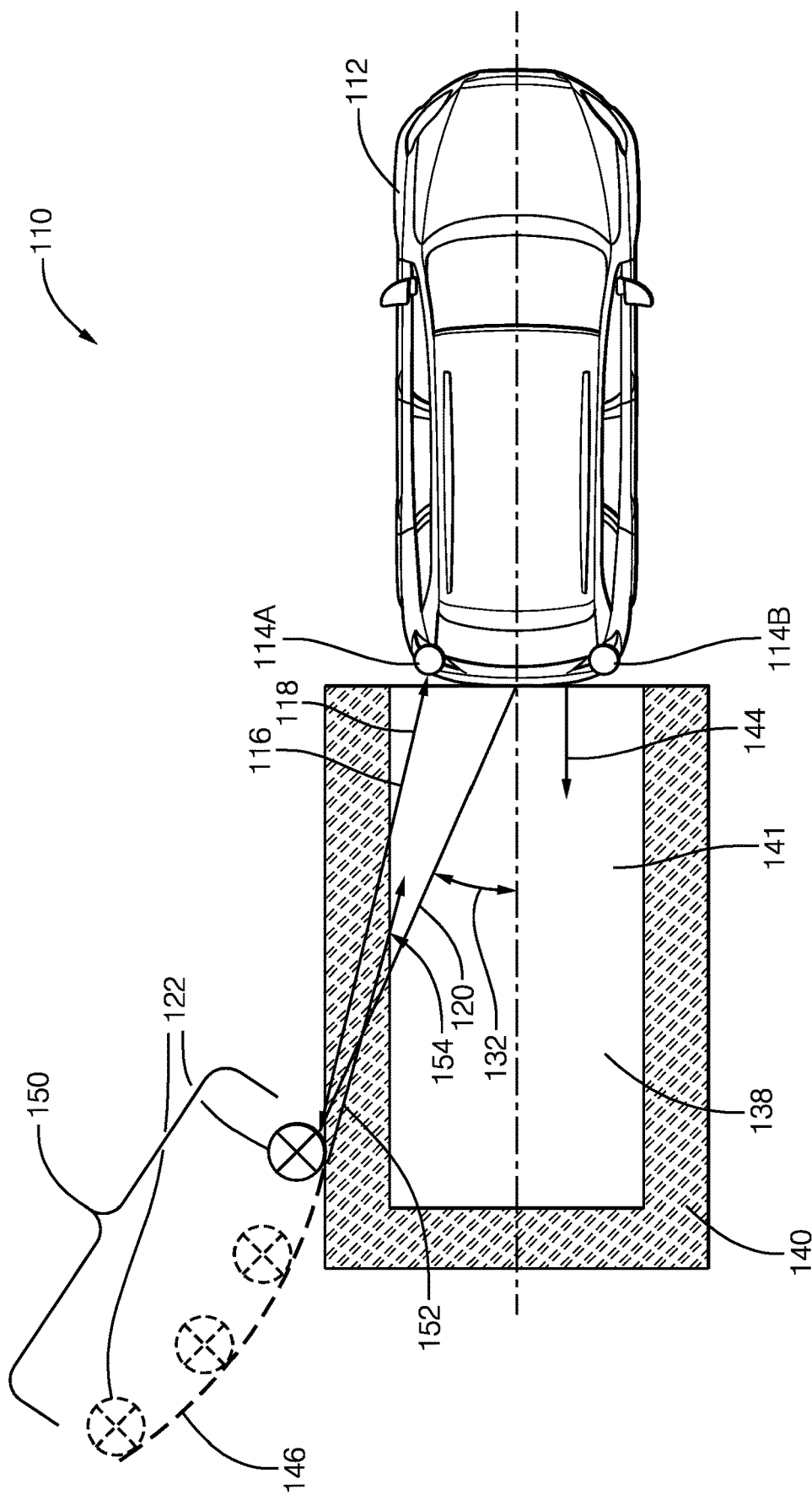
FIG. 6 is an illustration of a host-vehicle equipped with the braking-system of FIG. 5 in accordance with yet another embodiment.

The field-of-view 124 defines a conflict-zone 138 and a conflict-buffer 140 separate from the conflict-zone 138. The conflict-zone 138 and the conflict-buffer 140 correspond to a portion of the field-of-view 124, wherein the conflict-buffer 140 defines a border of the conflict-zone 138, as illustrated in FIGS. 5-7. The conflict-zone 138 may be a projection of a travel-path 141 of the host-vehicle 112, and may extend from both a left-corner and a right-corner of the host-vehicle 112 for any distance required to meet the application requirements. The length of the conflict-zone 138 may be varied based on a speed (not shown) of the host-vehicle 112. The conflict-buffer 140 may be any size required and may also be varied based on the speed of the host-vehicle 112. The object 122 in the conflict-zone 138 and the host-vehicle 112 will collide if the host-vehicle 112 continues to move toward the object 122. The field-of-view 124 also has a known vertical-angle (not shown) and a known horizontal-angle (not shown) that are design features of the ranging-sensor 114 and determine how close to the host-vehicle 112 the object 122 may be detected.

The system 110 also includes a braking-actuator 142 that controls movement 144 of the host-vehicle 112. Movement 144 may be defined as forward-movement and/or rearward-movement of the host-vehicle 112. In the non-limiting examples illustrated in FIGS. 5-7 the movement 144 is rearward-movement, that is, the host-vehicle 112 is performing a backing-maneuver. The braking-actuator 142 may be installed on each wheel of the host-vehicle 112 and may be a friction-device. The braking-actuator 142 may also be an electric-motor that may utilize regenerative-braking that may exist on hybrid-electric-vehicles or electric-vehicles, as will be understood by one skilled in the art.

The system 110 also includes the controller 136 in communication with the ranging-sensor 114 and the braking-actuator 142. The controller 136 may include a processor (not shown) such as a microprocessor or other control circuitry such as analog and/or digital control circuitry including an application specific integrated circuit (ASIC) for processing data as should be evident to those in the art. The controller 136 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the object 122 is going to be in the intended path of the host-vehicle 112 based on signals received by the controller 136 from the ranging-sensor 114 as described herein.

The controller 136 may analyze the radar-signal to categorize the data from each detected target 134 with respect to a list of previously detected targets 134 having established tracks. As used herein, a track refers to one or more data sets that have been associated with a particular one of the detected targets 134. By way of example and not limitation, if the amplitude of the radar-signal is above a predetermined amplitude threshold, then the controller 136 determines if the data corresponds to a previously detected target 134 or if a new-target has been detected. If the data corresponds to a previously detected target 134, the data is added to or combined with prior data to update the track of the previously detected target 134. If the data does not correspond to any previously detected target 134 because, for example, it is located too far away from any previously detected target 134, then it may be characterized as a new-target and assigned a unique track identification number. The identification number may be assigned according to the order that data for a new detected target 134 is received, or may be assigned an identification number according to a grid-location (not shown) in the field-of-view 124.

As illustrated in FIG. 6, the controller 136 may determine a trail 146 of the object 122 based on the range 118 and the direction 120. The trail 146 may be determined by any of the known curve fitting techniques including, but not limited to a least-squares fit method. The controller 136 may classify the object 122 as the slow-moving-object 126 when the range-rate 116 is less than a rate-threshold 148 and the trail 146 is converging 150 with the conflict-zone 138. The slow-moving-object 126 may appear to the typical radar-system as a stationary-object (not shown) when the speed is less than the rate-threshold 148. The rate-threshold 148 may be user defined and experimentation by the Inventor has discovered that the speed of the object 122 of less than 4.8 kilometer per hour (4.8 kph) is indicative of the slow-moving-object 126. The controller 136 may determine that the object 122 is converging 150 with the conflict-zone 138 based on a history of the tracks stored in the memory, where a reduction in the range 118 of the object 122 may be evident. In contrast to the slow-moving-object 126, the stationary-object may appear that it is moving in a line parallel to the host-vehicle 112 as the host-vehicle 112 performs the backing-maneuver, as will be understood by one skilled in the art.

The controller 136 may then determine a vector 152 based on the trail 146, and may activate the braking-actuator 142 when the slow-moving-object 126, the object 122 is detected within the conflict-buffer 140, and the vector 152 intersects 154 the conflict-zone 138, as illustrated in FIG. 6. The controller 136 may further determine the vector 152 at a point where the object 122 enters the conflict-buffer 140. As used herein, the vector 152 is tangent to the curve created by the trail 146 of the slow-moving-object 126.

As illustrated in FIG. 7, the controller 136 may further predict a future-path 156 of the object 122 based on the trail 146. The future-path 156 may be a polynomial-fit 158 of the trail 146 using any of the known methods of curve fitting. The controller 136 may not activate the braking-actuator 142 when the object 122 is detected within the conflict-buffer 140 and the vector 152 does not intersect 154 the conflict-zone 138.

Accordingly, an automatic braking-system 10, a controller 36 for the automatic braking-system 10 and a method 200 of operating an automatic braking-system 10 is provided. The automatic braking-system 10 is an improvement over prior braking systems because the system 10 is configured to classify the object 22 that is slow-moving 26 using the ranging-sensor 14. In contrast, prior braking systems detect slow-moving 26 objects 22 as stationary-objects, and may not provide sufficient time to stop the host-vehicle 12 when the slow-moving 26 object 22 converges with the conflict-zone 38. While this invention has been described in terms of the preferred embodiments thereof, it is not intended to be so limited, but rather only to the extent set forth in the claims that follow.

I claim:

1. A system comprising:
a ranging-sensor used to detect a range-rate, a range, and a direction of an object proximate to a host-vehicle when the object resides in a field-of-view of the ranging-sensor, wherein the field-of-view defines a conflict-zone and a conflict-buffer separate from the conflict-zone, the conflict-zone and the conflict-buffer corresponding to a portion of the field-of-view, wherein the conflict-buffer defines a border of the conflict-zone;
a braking-actuator used to control movement of the host-vehicle; and
a controller in communication with the ranging-sensor and the braking-actuator, wherein the controller:
determines a curved trail of the object based on the range and the direction;
determines a tangent-vector based on the curved trail; and
activates the braking-actuator in response to:
detecting the object within the conflict-buffer; and
determining the tangent-vector intersects the conflict-zone.

2. The system in accordance with claim 1, wherein the controller further determines the tangent-vector at a point where the object enters the conflict-buffer.

3. The system in accordance with claim 1, wherein the controller predicts a future-path of the object based on the curved trail.

4. The system in accordance with claim 3, wherein the future-path is a polynomial fit of the curved trail.

5. The system in accordance with claim 1, wherein the conflict-zone is a projection of a travel-path of the host-vehicle.

6. The system in accordance with claim 1, wherein the controller does not activate the braking-actuator in response to:
detecting the object within the conflict-buffer; and
determining the tangent-vector does not intersect the conflict-zone.

7. The system in accordance with claim 1, wherein the ranging-sensor is a two-dimensional radar-sensor.

8. The system in accordance with claim 1, wherein the ranging-sensor is a lidar-sensor.

9. The system in accordance with claim 1, wherein the curved trail comprises a history of detections of the object stored in a memory of the controller.

10. The system in accordance with claim 1, wherein the tangent-vector is tangent to a curve of a line created by the curved trail.

11. A method comprising:
   detecting, using a ranging-sensor, a range-rate, a range, and a direction of an object proximate to a host-vehicle when the object resides in a field-of-view of the ranging-sensor, wherein the field-of-view defines a conflict-zone and a conflict-buffer separate from the conflict-zone, the conflict-zone and the conflict-buffer corresponding to a portion of the field-of-view, wherein the conflict-buffer defines a border of the conflict-zone;
   controlling movement of the host-vehicle using a braking-actuator; and
   determining, with a controller in communication with the ranging-sensor and the braking-actuator, a curved trail of the object based on the range and the direction;
   determining a tangent-vector based on the curved trail; and
   activating the braking-actuator in response to:
      detecting the object within the conflict-buffer; and
      determining the tangent-vector intersects the conflict-zone.

12. The method in accordance with claim 11, further comprising the step of determining with the controller the tangent-vector at a point where the object enters the conflict-buffer.

13. The method in accordance with claim 11, further comprising the step of predicting with the controller a future-path of the object based on the curved trail.

14. The method in accordance with claim 13, wherein the future-path is a polynomial fit of the curved trail.

15. The method in accordance with claim 11, wherein the conflict-zone is a projection of a travel-path of the host-vehicle.

16. The method in accordance with claim 11, further comprising the step of preventing activation of the braking-actuator by the controller in response to:
   detecting the object within the conflict-buffer; and
   determining the tangent-vector does not intersect the conflict-zone.

17. The method in accordance with claim 11, wherein the ranging-sensor is a two-dimensional radar-sensor.

18. The method in accordance with claim 11, wherein the ranging-sensor is a lidar-sensor.

19. The method in accordance with claim 11, wherein the curved trail comprises a history of detections of the object stored in a memory of the controller.

20. The method in accordance with claim 11, wherein the tangent-vector is tangent to a curve of a line created by the curved trail.

21. A system, comprising:
   a controller in communication with a ranging-sensor and a braking-actuator;
      the ranging-sensor used to detect an object proximate to a host-vehicle;
      the braking-actuator used to control movement of the host-vehicle;
   wherein the controller:
      determines a conflict-zone and a conflict-buffer separate from the conflict-zone;
         the conflict-buffer defining an exterior border of the conflict-zone;
      determines a curved trail of the object based on the ranging-sensor;
      determines a tangent-vector based on the curved trail; and
      activates the braking-actuator in response to:
         detecting the object within the conflict-buffer; and
         determining the tangent-vector intersects the conflict-zone.

* * * * *